United States Patent
Clifford et al.

(10) Patent No.: US 9,930,821 B2
(45) Date of Patent: Apr. 3, 2018

(54) AGRICULTURAL VEHICLE SUPPORT FRAME

(71) Applicant: CNH Industrial America LLC, New Holland, PA (US)

(72) Inventors: Jimmie D. Clifford, Lancaster, PA (US); Frank R. G. Duquesne, Zwevegem (BE); Herbert M. Farley, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/016,074

(22) Filed: Feb. 4, 2016

(65) Prior Publication Data
US 2016/0234992 A1   Aug. 18, 2016

Related U.S. Application Data

(60) Provisional application No. 62/117,549, filed on Feb. 18, 2015.

(51) Int. Cl.
| | |
|---|---|
| *B60B 35/10* | (2006.01) |
| *A01B 63/00* | (2006.01) |
| *A01B 73/00* | (2006.01) |
| *B62D 7/18* | (2006.01) |
| *B62D 49/06* | (2006.01) |

(52) U.S. Cl.
CPC ............ *A01B 63/006* (2013.01); *A01B 73/00* (2013.01); *B60B 35/10* (2013.01); *B60B 35/1036* (2013.01); *B62D 7/18* (2013.01); *B62D 49/0678* (2013.01); *B60G 2300/40* (2013.01)

(58) Field of Classification Search
CPC ... A01B 63/006; A01B 73/00; B60B 35/1036; B60B 35/1045; B60B 35/1054; B60B 35/1063; B60B 35/10; B62D 7/18; B62D 49/0678; B60G 2300/40; E02F 9/024
USPC .................. 280/5.52, 638; 180/209; 301/128
See application file for complete search history.

(56) References Cited

U.S. PATENT DOCUMENTS

| | | |
|---|---|---|
| 3,306,390 A | 2/1967 | Georges |
| 7,954,583 B2 | 6/2011 | Coers et al. |
| 7,963,361 B2 | 6/2011 | Coers et al. |

(Continued)

FOREIGN PATENT DOCUMENTS

| | | | |
|---|---|---|---|
| BE | 1009973 A4 | * | 11/1997 |
| DE | 602004008391 T2 | | 5/2008 |

(Continued)

*Primary Examiner* — Keith J Frisby
(74) *Attorney, Agent, or Firm* — Patrick M. Sheldrake

(57) ABSTRACT

An Agricultural vehicle has a frame supported by a front pair of wheels and a back pair of wheels, wherein the back pair of wheels are steerable and wherein each wheel of the back pair of wheels is connected to the frame via a respective intermediate support element that is pivotable with respect to the frame in such a manner that the back pair of wheels are movable between a first position wherein the back pair of wheels defines a first track width and are positioned at a first distance from the front pair of wheels, and a second position wherein the back pair of wheels defines a second track width and are positioned at a second distance from the front pair of wheels, wherein the first track width is larger than the second track width and wherein the first distance is smaller than the second distance.

11 Claims, 2 Drawing Sheets

(56) References Cited

U.S. PATENT DOCUMENTS 8,205,899 B2   6/2012   Mackin et al.
8,746,388 B2   6/2014   Budweil
9,174,488 B2   11/2015   Berry et al.

FOREIGN PATENT DOCUMENTS

| | | |
|---|---|---|
| EP | 1738928 A1 | 1/2007 |
| EP | 1920995 A2 | 5/2008 |
| GB | 2311967 A | 10/1997 |
| NL | 1002535 C2 | 9/1997 |
| WO | 2005056308 A1 | 6/2005 |

\* cited by examiner

AGRICULTURAL VEHICLE SUPPORT FRAME

This application claims the benefit of and priority to U.S. Provisional Application No. 62/117,549, filed Feb. 18, 2014, entitled "Agricultural Vehicle Support Frame", which is hereby incorporated by reference in its entirety.

FIELD OF THE INVENTION

The present invention relates to an agricultural vehicle comprising frames supported by a front pair of wheels and a back pair of wheels, wherein the back pair of wheels is steerable.

BACKGROUND OF THE INVENTION

The width of an agricultural vehicle has an impact on the capacity that can be obtained from the machine. A trend in the design of agricultural vehicles, especially combines and other equipment used to traverse a field, is for the size of the machines to become larger, reducing the number of passes required to cover a field. Agricultural harvesters, such as combines, include a header and a feeder housing which remove the crop material from the field, gather the crop material and transport the crop material to a separator in the harvester. The separator removes the grain crop material from the non-grain crop material, also known as residue. As the width of the header of the harvester is increased, more crop material can be processed and harvested. As a result, it is necessary to increase the capacity of processing equipment and crop storage bins on the harvester body. The supporting structure, including the frame and wheels, must be enlarged to provide the necessary stability for the overall larger size of the equipment. On the field, it is therefore found necessary to increase the track width of the vehicle to provide the necessary stability. However, the track width for driving on the public roads is limited by legislations in many countries.

EP 2 168 786 describes an axle for an agricultural vehicle such as a combine, with a variable track width. A drawback of the described system is that the maximum turning angle in a narrow track width position is limited.

SUMMARY OF THE INVENTION

It is an object of the present invention to provide an alternative solution for adapting the track width of an agricultural vehicle.

To this end, the agricultural vehicle according to the invention comprises a frame supported by a front pair of wheels and a back pair of wheels, wherein the back pair of wheels are steerable and wherein each wheel of the back pair of wheels is connected to the frame via a respective intermediate support element that is pivotable with respect to the frame in such a manner that the back pair of wheels are movable between a first position wherein the back pair of wheels defines a first track width and are positioned at a first distance from the front pair of wheels, and a second position wherein the back pair of wheels defines a second track width and are positioned at a second distance from the front pair of wheels, wherein the first track width is larger than the second track width and wherein the first distance is smaller than the second distance.

The back pair of wheels of the agricultural vehicle of the invention is connected to the frame via intermediate support elements. By rotating/pivoting these intermediate support elements with respect to the frame, the track width is adaptable in an alternative manner. However, tests have shown that adapting the track width in this manner has further unexpected advantages. By rotating/pivoting the intermediate support elements, not only the track width of the back pair of wheels is adapted, but also the wheel base, which is defined by the distance between the front wheels and the back wheels, is adapted. Particularly, the wheel base is enlarged when the track width is reduced. In this context, it is noted that the reduced track width is mainly intended for road use of the agricultural vehicle. By stretching the wheel base during road use, the steering behavior is more stable, since it is less responsive, which contributes to safety on road. On the other hand, when the back pair of wheels is in wide track mode, intended for field use for the agricultural vehicle, the smaller wheel base will have a positive effect on the turning radius of the agricultural vehicle.

The invention is further based on the insight that during road use of the agricultural vehicle, the wheelbase of the vehicle can be large preferably having as a result that the back pair of wheels can be positioned substantially behind the frame of the agricultural vehicle without hindering operation of the vehicle. In this context, it is noted that in field use, many agricultural vehicles require a free space at the back end of the vehicle, for example a harvester expels residue at the back end of the vehicle and in another example a baler unloads the bales via the back end of the vehicle. During field use, there are no restrictions as to the width of the vehicle so that the wheels can be positioned in wide track. In this wide track position, the wheelbase is smaller preferably having as a result that the back pair of wheels is positioned substantially adjacent to the frame, so that the back end of the frame is not obstructed. This shows that the vehicle according to the invention is optimized for road use when the back of pair wheels are in the second position, and is optimized for field use when the back pair of wheels are in the first position.

It will be clear in this context that the distance between a front pair of wheels and a back pair of wheels is defined as the distance measured in the longitudinal direction of the vehicle between the axes of the wheels when the wheels are oriented in a straight forward position.

Preferably a predetermined minimum clearance is provided in both first position and the second position between each one of the back pair of wheels and the frame to allow steering of the back wheels in both positions. Thereby, the predetermined minimum clearance relates to the space between the frame and the wheel that is required to allow the wheel to be steerable. The skilled person will understand that a wheel that is steered, meaning that is rotated around an axis that is substantially vertical, needs some free space. Particularly when the back pair of wheels are in the second position, achieving a predetermined minimum clearance is found to be surprisingly easy since the wheels are positioned substantially behind the frame. Also in the situation where the back pair of wheels is located in the first position, a predetermined minimum clearance is found to be easy to provide since no track width restrictions apply because this is the field mode of the agricultural vehicle.

Preferably the front pair of wheels defines a front track width and the first track width is larger than the front track width and the second track width is equal or smaller than the front track width. In such a configuration, the front pair of wheels can be provided with a fixed track width. This fixed track width is preferably limited by the requirements for road use. By providing the back pair of wheels with a first track width that is larger than the front track width, a higher stability during field use of the agricultural vehicle is obtained. By providing the back pair of wheels with a second track width that is equal or smaller than the first track width, the agricultural vehicle meets the requirement for travelling on the road.

Preferably each intermediate support element is pivotably connected to a central zone of the frame, the central zone being located at the back end of the vehicle. When the intermediate support elements are connected to a central zone at the back end of the frame, the back pair of wheels can be easily moved by rotating/pivoting the intermediate support elements between a position where the back pair of wheels show a larger track width and a smaller wheelbase, and a further position where the back pair of wheels show a smaller track width and a larger wheelbase.

Preferably a steering mechanism is provided at the back pair of wheels for steering the back pair of wheels in both the first position and in the second position. Thereby, preferably each of the back pair of wheels is connected to the intermediate support element and to the steering mechanism via a steering knuckle. Thereby, the steering mechanism is preferably formed as a rod extending substantially parallel to the intermediate support element between the frame and the steering knuckle. The steering geometry, formed by the intermediate support elements, the steering rod and the steering knuckle, acts as a parallelogram linkage which keeps the wheels parallel to each other when the back pair of wheels are rotated between a first and a second position. Thereby, the steering rods are typically connected to the frame via a central steering element, which central steering element is able to shift leftward and rightward with respect to the frame to thereby push the steering rods into a steering position. In this manner, the back pair of wheels can be steered. The central steering element is preferably controllable by an operator of the vehicle, so that the operator is able to steer the agricultural vehicle.

Preferably a bar extends between the pair of wheels, which bar has an adaptable length. Thereby, the bar preferably comprises an actuator for moving the back pair of wheels between the first position and the second position by adapting the length of the bar. In such a configuration, a simple longitudinal actuator can be used to switch the back pair of wheels between a first position and a second position. Thereby the bar is preferably pivotably connected to the steering knuckle of each one of the back pair of wheels. In this manner, the track width can be set by setting the length of the bar, which track width automatically also determines the position of the back wheels in the direction of travel of the vehicle.

The invention further relates to a supporting assembly for an agricultural vehicle, the supporting assembly comprising a pair of wheels which are steerable and wherein each wheel of the pair of wheels is adapted to be connected to a back end of a frame of the agricultural vehicle via a respective intermediate support element that is pivotable with respect to the frame in such a manner that the pair of wheels is movable between a first position where the wheels define a first track width and are positioned at a first distance from a front pair of wheels of the vehicle, and a second position where the wheels define a second track width and are positioned at a second distance from the front pair of wheels, wherein the first track width is larger than the second track width and wherein the first distance is smaller than the second distance. By mounting this supporting assembly to an agricultural vehicle, an agricultural vehicle according to the invention is obtained.

BRIEF DESCRIPTION OF THE DRAWINGS

The invention will now be described in more details with respect to the drawings illustrating some preferred embodiments of the invention. In the drawings.

In the drawings a same reference number has been allocated to a same or analogous element.

DETAILED DESCRIPTION OF PREFERRED EMBODIMENTS

Figure 1:
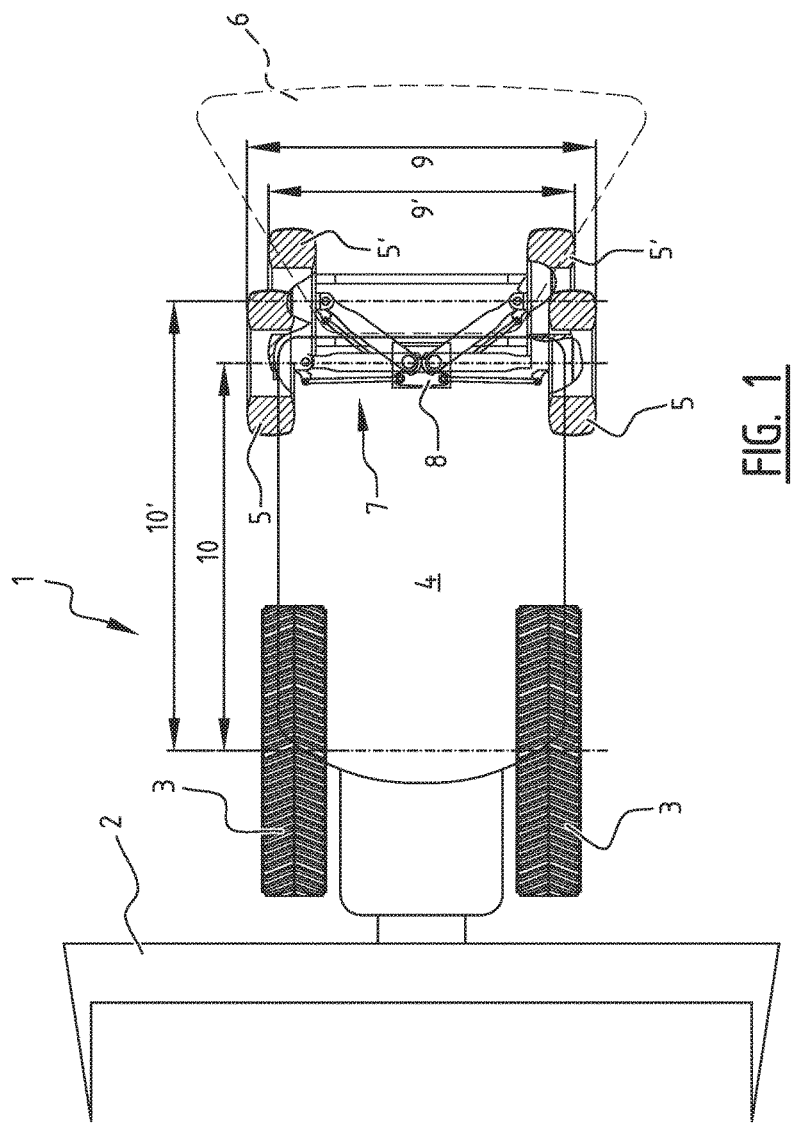
FIG. 1 shows a top view of an agricultural harvester according to an embodiment of the invention.

FIG. 1 shows a top view of an agricultural harvester 1. The agricultural harvester 1 has a header 2 that is, at least in field mode of the agricultural harvester 1, connected to a body 4 at a front end of the vehicle 1. The body 4 is supported by a front pair of wheels 3 and a back pair of wheels 5. In FIG. 1, the back pair of wheels 5 is shown in two positions. The back pair of wheels indicated with reference number 5 shows the first position and the back pair of wheels indicated with reference number 5' shows the second position. The back pair of wheels is connected to the body 4 of the agricultural vehicle via a supporting system 7 that is described hereunder with reference to FIGS. 2 and 3. The supporting system 7 is connected to the body 4 and a central zone 8 at the back end of the vehicle 1.

The supporting system 7, described in more detail hereunder, allows the back pair of wheels 5 to move between the first position 5 and the second position 5'. Thereby, the first position 5 is optimized for field use of the agricultural vehicle 1. To this end, the wheels of the back pair of wheels 5 in the first position are positioned substantially adjacent to the frame of the vehicle 1. Thereby the frame of the vehicle 1 is defined as the supporting structure that supports the body 4 of the vehicle 1. Substantially adjacent to the frame is defined as at least 50% of the volume of the wheels 5 is located adjacent to the frame. Substantially adjacent to the frame can be alternatively defined as that the rotation axis of the wheels 5 in the first position intersect with the frame of the vehicle 1, at least when the wheels 5 in the first position are steered into a straight forward position. In this first position 5 of the back pair of wheels, the vehicle 1 has a wheelbase 10 that is smaller than the wheelbase 10' in the second position 5' of the back pair of wheels. A smaller wheelbase 10 improves the turnability of the vehicle, which is a significant advantage during field use of the vehicle 1. In the first position 5 of the back pair of wheels, the track width 9 is larger than the track width 9' of the back pair of wheels in the second position 5'. The larger track width 9 improves the stability of the vehicle 1, which is an advantage in field use. In this context, it is noted that in field use, the agricultural vehicle 1 typically expels residue at the back end of the vehicle. Therefore, in field use, the vehicle requires a free space 6 at the back end of the vehicle. When the back pair of wheels 5 are in the first position, the wheels 5 are located outside of the free space 6, so that the wheels do not hinder the expelling of residue.

In the second position of the back pair of wheels 5', the supporting system 7 is rotated at least partially towards the back end of the vehicle 1. In the second position 5', the wheels are substantially positioned behind the frame of the vehicle 1. Thereby, substantially behind the frame is defined as that at least 50% of the volume of the wheels 5' is located behind the frame that supports the body 4 of the vehicle 1. Substantially behind the frame can alternatively be defined as that the rotation axis of the wheels 5' in the second position do not intersect with the frame of the vehicle at least when the back pair of wheels 5' are steered into a straight forward position. In the second position 5' of the back pair of wheels, the track width 9' is smaller. This allows the vehicle to be driven on public roads where the maximum track width is limited by regulations. Furthermore, the wheel base 10' is larger. This has a positive effect on both the distribution of weight and the steering sensitivity. Because the wheel base is larger, more weight is on the front pair of wheels 3, which are typically larger, so that the pressure per square centimeter/inch on the road surface is limited. Also due to the larger wheel base 10', the steering sensitivity is less responsive so that steering the vehicle is safer. In this context, it is noted that in road use of the vehicle 1, the header 2 is typically removed. Furthermore, in road use, the agricultural vehicle 1 is not operating, so that the free zone 6 for expelling residue is unused. Therefore, in the second position 5' of the back pair of wheels, the wheels can be located in the free space 6 without this being a disadvantage.

Because the supporting system 7 is able to rotate the back pair of wheels 5 between a first position 5 and a second position 5', the track width of the vehicle 1 is adaptable. Thereby, a further advantage of the rotation of the back pair of wheels to the back of the vehicle, is that both in wide track mode (first position 5) and in small track mode (second position 5'), the wheels 5 have enough space around them for steering of the agricultural vehicle 1. In wide track mode, having enough space to rotate the wheels 5 is rather common since in wide track mode the wheels are further away from the body 4 of the vehicle 1. In narrow track modes, however, the wheels 5' are conventionally moved towards the body 4 of the vehicle, so that the clearance between body 4 and the wheels 5' is too small for adequate steering of the wheels 5'. However in the present invention, the wheels 5' are rotated backward, preferably into a position substantially behind the agricultural vehicle 1. As a result, the wheels 5' in the second position have enough space to be steered, meaning that there is a predetermined minimum amount of clearance between the wheels 5' and the body 4 of the agricultural vehicle 1 in the second position. In this context, it is noted that also in the first position 5 the wheels show a predetermined minimum amount of clearance between the wheels 5 and the body 4 of the vehicle 1.

Although FIG. 1 illustrates an agricultural harvester with the supporting system according to the invention, it will be clear that the system can also be applied to other types of agricultural vehicles. The supporting assembly of the invention can also be applied to for example an agricultural baler. In an agricultural baler, the free space 6 has a different shape and is intended for ejecting bales from the baler. Thereby the back pair of wheels in the second position 5' can be located in the free space 6 for road use of the baler, while the back pair of wheels in the first position 5 are outside of the free space, increasing the track width and thereby the stability of the baler, and reducing the wheel base and thereby increasing the turnability of the baler.

The supporting assembly of the agricultural vehicle 1 is preferably designed so that the track width 9 in the first position of the back pair of wheels 5 is larger than the track width of the front wheels 3, furthermore, the supporting assembly is preferably designed such that the track width 9' of the back pair of wheels in the second position 5' is equal or smaller than the track width of the front pair of wheels 3.

Figure 2:
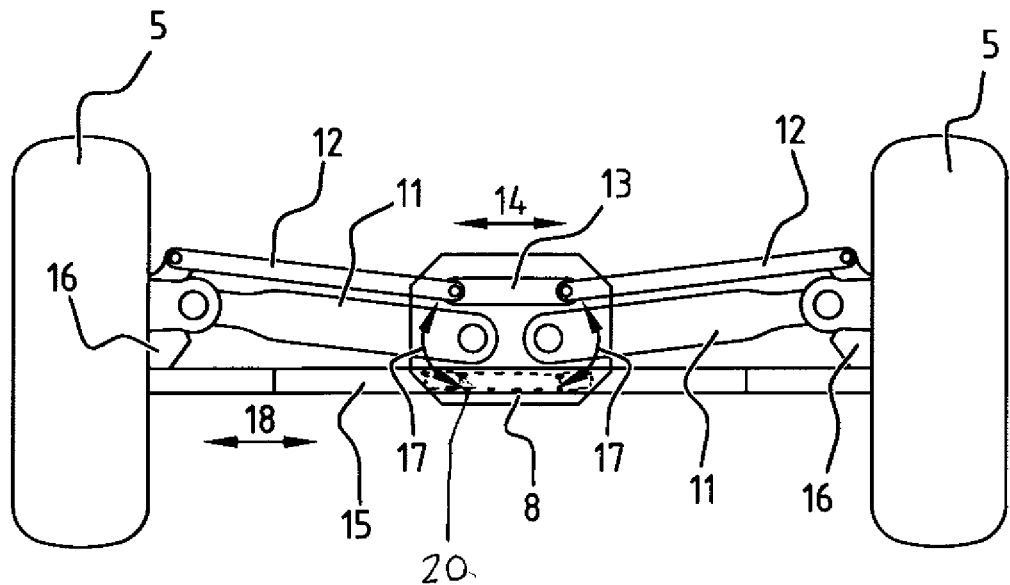
FIG. 2 shows a supporting assembly according to an embodiment of the invention in a first position.
Figure 3:
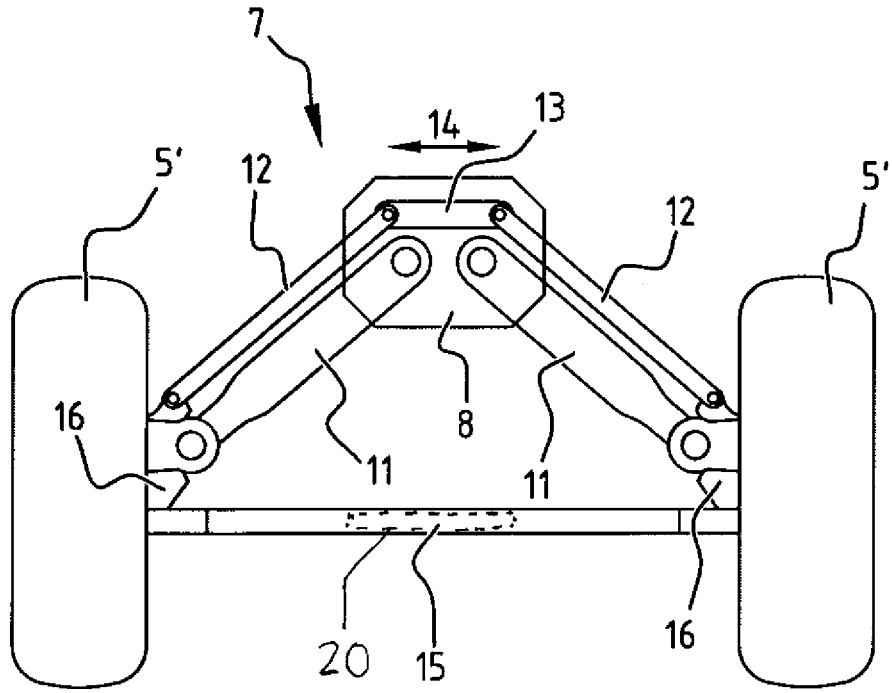
FIG. 3 shows a supporting assembly according to an embodiment of the invention in a second position.

FIG. 2 illustrates the supporting assembly in a first position while FIG. 3 shows the same supporting assembly in the second position. The supporting assembly comprises supporting elements 7 adapted on the one hand to be connected to a central zone 8 of the frame at the back end of an agricultural vehicle, and on the other hand to support a pair of wheels 5. In the example of FIGS. 2 and 3, the central zone 8 of the frame is shown as a separate element. It will be clear however, that the central zone 8 of the frame can be integrally formed with other parts of the frame of the agricultural vehicle or the supporting structure of the agricultural vehicle 1.

The supporting elements 7 comprise a respective intermediate supporting element 11 for each wheel of the pair of wheels. The intermediate supporting element 11 extends between the central zone 8 and the wheel 5. The intermediate supporting element 11 is rotatably connected to the frame 8. Particularly, each intermediate supporting element can rotate between a first position wherein the intermediate support element extends substantially in the transverse direction of the vehicle 1 and a second position wherein the intermediate support element extends at least partially towards a back end of the vehicle. Thereby, the intermediate support element preferably extends substantially horizontal between the frame 8 and the wheels 5 in both the first and the second position. Thereby substantially horizontal is defined as where the maximum of 20 degrees with respect to the horizontal plane, preferably with a maximum degree of 10 degrees with respect to the horizontal plane.

Each wheel 5 is preferably provided with a knuckle so that the intermediate support element 11 can be connected to the wheel 5 via the knuckle 16. Thereby a steering mechanism can be provided to steer the wheels. This steering mechanism can be formed as a rotational actuator (not shown) positioned at the knuckle 16 of the wheel 5. Preferably, the steering mechanism is formed as shown in FIGS. 2 and 3 by a steering rod 12 that extends between a steering element 13 at the central zone 8 of the frame and the steering knuckle. Such steering mechanisms are known and widely used in conventional multilink suspension systems of vehicles. An unexpected advantage of using this steering mechanism in the present invention is that the steering mechanism can be so configured together with the intermediate supporting element that they form a parallelogram. The effect of forming a parallelogram is that the wheels 5 automatically stay aligned parallel to each other when the wheels 5 are moved from the first position 5 to the second position 5'. This makes the steering mechanism of the invention fail proof. The central steering element 13 is moveable 14 in the transverse direction so that the wheels 5 are steerable by moving the steering element 13.

The supporting assembly 7 of the invention preferably further comprises a bar 15 that extends between the two wheels 5 of the pair of wheels. Preferably the bar 15 is connected to the respective wheel knuckles. The bar 15 is extendable 18. Thereby, the bar 15 allows the distance between the wheels to change, consequently the track width to change. The adaptable length of the bar 15 is illustrated in the figures with arrow 18.

The movement of the wheels 5 between the first position 5 and the second position 5' can be driven in multiple ways. In a first example rotary actuators (not shown) are provided at the central zone 8 of the frame to force the intermediate supporting elements 11 into a rotation 17. Such configuration would preferably require a rotary actuator for each one of the intermediate supporting elements 11. Alternatively, the movement of the wheels is actuated by a linear actuator 20 in the bar 15 for forcing the length of the bar 15 to change 18. By changing the length of the bar 15, which interconnects the back pair of wheels 5, the track width is adapted and the intermediate supporting elements 11 rotate with respect to the frame between their first position and their second position. The bar 15 can further be configured to have a stabilizing effect on the agricultural vehicle 1.

Based on the figures and the description, the skilled person will be able to understand the operation and advantages of the invention as well as different embodiments thereof. It is however noted that the description and figures are merely intended for understanding the invention, and not for limiting the invention to certain embodiments or examples used therein. Therefore it is emphasized that the scope of the invention will only be defined in the claims.

The invention claimed is:

1. An agricultural vehicle comprising:
   a frame;
   a front pair of wheels;
   a back pair of wheels, said frame being supported by the front pair of wheels and the back pair of wheels, said back pair of wheels are steerable, said back pair of wheels are movable between a first position wherein the back pair of wheels defines a first track width and are positioned at a first distance from the front pair of wheels, and a second position wherein the back pair of wheels defines a second track width and are positioned at a second distance from the front pair of wheels, said first track width is larger than the second track width and the first distance is smaller than the second distance, said back pair of wheels in the second position are positioned substantially behind the frame, each said back wheel of said back pair of wheels including a steering knuckle;
   a respective intermediate support element connecting each said steering knuckle of said back pair of wheels to the frame, each said respective intermediate support element being pivotable with respect to the frame in such a manner that said back pair of wheels are movable between said first position and said second position;
   a pair of steering mechanisms in the form of a pair of steering rods respectively and pivotally connected to said frame and said steering knuckles of said back pair of wheels for steering the back pair of wheels in both the first position and the second position, said steering rods respectively extending substantially parallel to said intermediate support elements between said frame and said steering knuckles; and
   a bar pivotally coupled to said steering knuckles of said back pair of wheels and interconnecting said back pair of wheels, said bar has an adaptable length, said bar extending horizontally between said back pair of wheels in both of said first position and said second position.

2. The agricultural vehicle according to claim 1, wherein a predetermined minimum clearance is provided in both the first position and the second position between the each one of the back pair of wheels and the frame to allow steering of the back wheels in both positions.

3. The agricultural vehicle according to claim 1, wherein the front pair of wheels defines a front track width and wherein the first track width is larger than the front track width and wherein the second track width is equal or smaller than the front track width.

4. The agricultural vehicle according to claim 1, wherein each said intermediate support element is pivotably connected to a central zone of the frame.

5. The agricultural vehicle according to claim 1, wherein the bar comprises an actuator for moving the back pair of wheels between the first position and the second position by adapting the length of the bar.

6. The agricultural vehicle according to claim 1, wherein the back pair of wheels in the first position are positioned substantially adjacent to the frame.

7. A supporting assembly for an agricultural vehicle, the supporting assembly comprising:
   a frame having a back end;
   a front pair of wheels;
   a back pair of wheels which are steerable, said back pair of wheels are movable between a first position where the wheels of the back pair of wheels define a first track width and are positioned at a first distance from the front pair of wheels of the agricultural vehicle, and a second position where the wheels of the back pair of wheels define a second track width and are positioned at a second distance from the front pair of wheels, said first track width is larger than the second track width and the first distance is smaller than the second distance, said back pair of wheels in the second position are positioned substantially behind the frame, each said back wheel of said back pair of wheels including a steering knuckle;
   a respective intermediate support element connecting each said steering knuckle of said back pair of wheels to the back end of the frame of the agricultural vehicle, each said respective intermediate support element is pivotable with respect to the frame in such a manner that said back pair of wheels is movable between said first position and said second position;
   a pair of steering mechanisms in the form of a pair of steering rods respectively and pivotally connected to the back end of the frame and said steering knuckles of said back pair of wheels for steering the back pair of wheels in both the first position and the second position, said steering rods respectively extending substantially parallel to said intermediate support elements between said frame and said steering knuckles; and
   a bar pivotally coupled to said steering knuckles of said back pair of wheels and interconnecting said back pair of wheels, said bar has an adaptable length, said bar extending horizontally between said back pair of wheels in both of said first position and said second position.

8. The agricultural vehicle according to claim 7, wherein a predetermined minimum clearance is provided in both the first position and the second position between the each one of the back pair of wheels and the frame to allow steering of the back wheels in both positions.

9. The agricultural vehicle according to claim 7, wherein the front pair of wheels defines a front track width and wherein the first track width is larger than the front track width and wherein the second track width is equal or smaller than the front track width.

10. The agricultural vehicle according to claim 7, wherein each said intermediate support element is pivotably connected to a central zone of the frame.

11. The agricultural vehicle according to claim 7, wherein the bar comprises an actuator for moving the back pair of wheels between the first position and the second position by adapting the length of the bar.

* * * * *